L. G. RILEY.
ELECTRIC VEHICLE.
APPLICATION FILED AUG. 3, 1917.
1,360,319.
Patented Nov. 30, 1920.
2 SHEETS—SHEET 1.
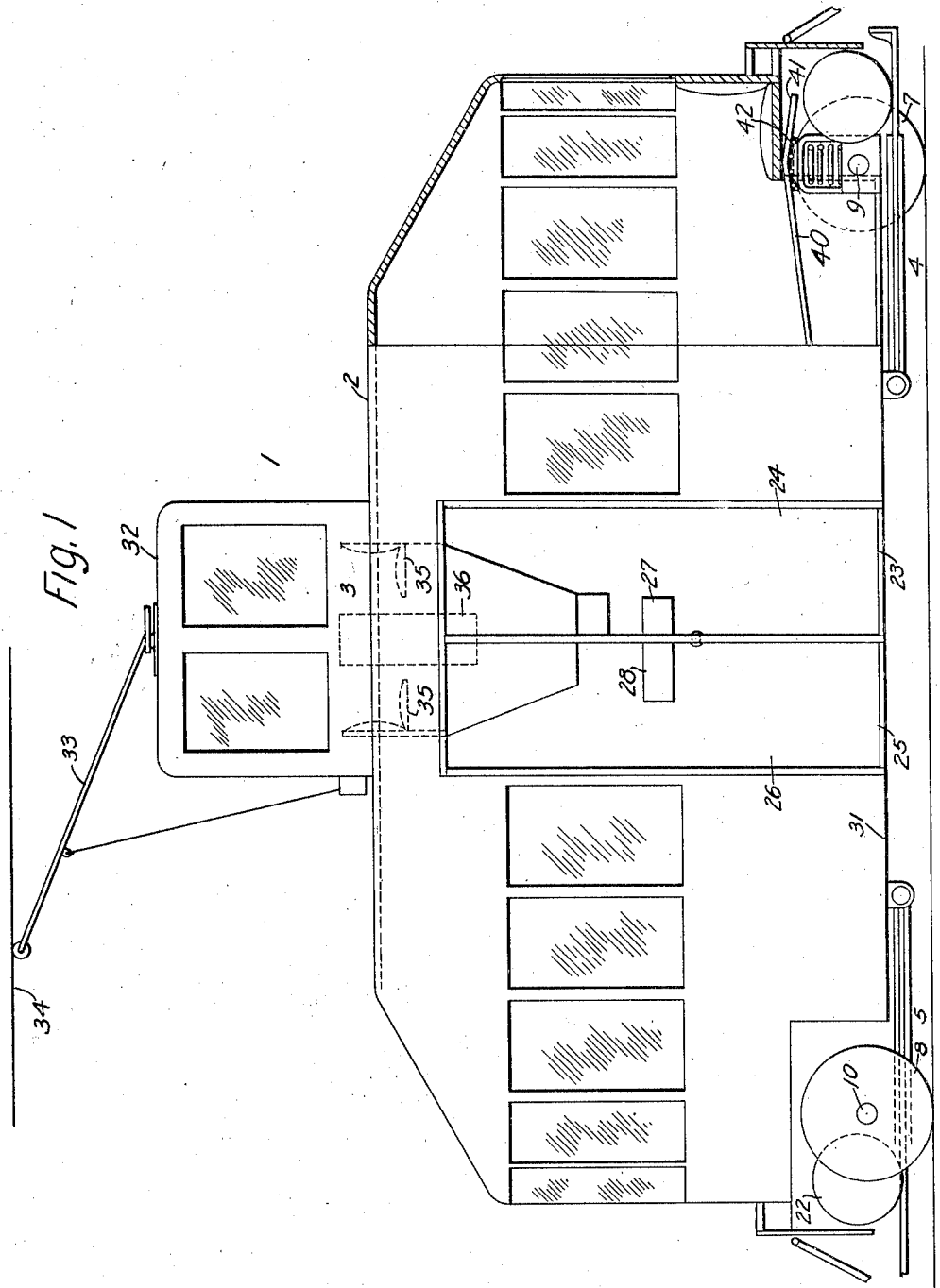
WITNESSES:
Fred. C. Wilharm
W. B. Wells
INVENTOR
Lynn G. Riley
BY
Wesley G. Carr
ATTORNEY

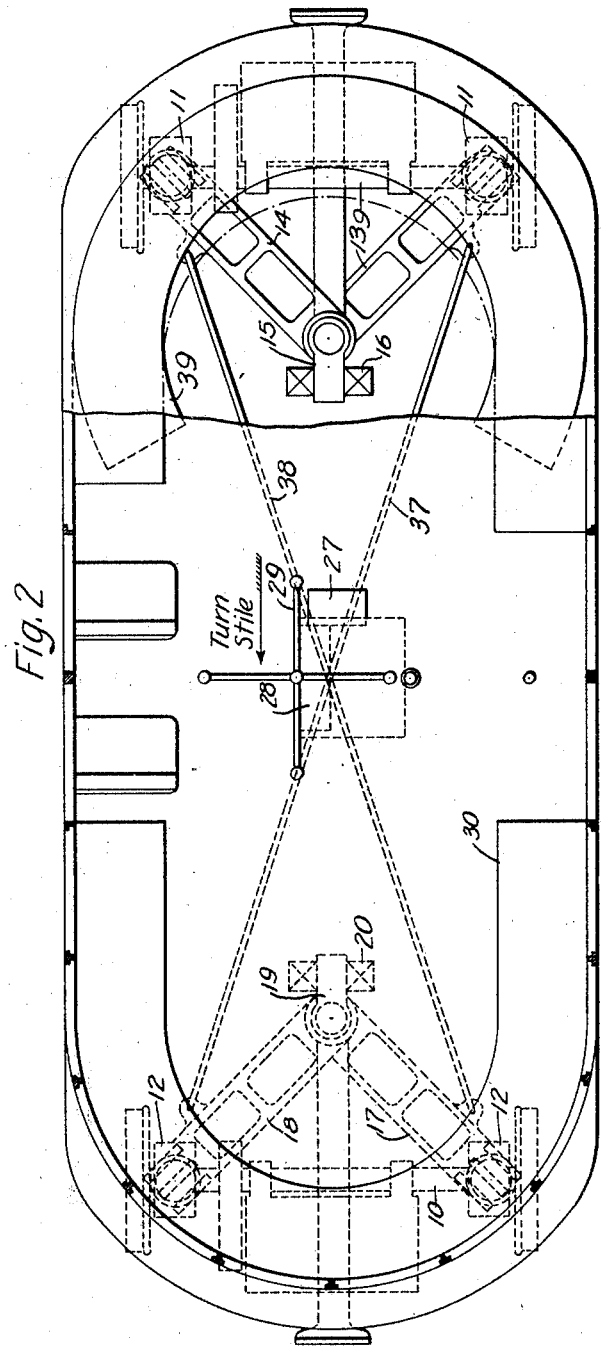

UNITED STATES PATENT OFFICE.

LYNN G. RILEY, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC VEHICLE.

1,360,319. Specification of Letters Patent. Patented Nov. 30, 1920.

Application filed August 3, 1917. Serial No. 184,233.

*To all whom it may concern:*

Be it known that I, LYNN G. RILEY, a citizen of the United States, and a resident of Wilkinsburg, in the county of Allegheny and State of Pennsylvania, have invented a new and useful Improvement in Electric Vehicles, of which the following is a specification.

My invention relates to electric vehicles and particularly to street cars of the so-called one-man type.

One object of my invention is to provide an electric vehicle that shall be compact, rugged and relatively inexpensive in construction and be economical and simple to operate.

Another object of my invention is to provide an electric vehicle of the above indicated character that shall embody a body portion having a booth disposed in the top central portion thereof for the operator of the vehicle and for containing the main control apparatus, and a central entrance to and exit from the vehicle.

Another object of my invention is to provide an electric vehicle with a body portion, two two-wheel propelling trucks that are pivotally joined to the body portion and are connected together in a manner to maintain them in alinement with each other, and means for supporting the weight of the body portion on said trucks in order to maintain the latter in correct alinement with the body portion.

More specifically, my invention embodies an electric vehicle provided with a body portion, two two-wheel propelling trucks that are pivotally joined to the body portion, and means for supporting the weight of the body portion on the trucks in a manner to maintain the trucks in correct alinement. The body portion is provided with a booth in a top central portion thereof for the operator and for containing the main control apparatus. A fare box is disposed below, and under the supervision of, the operator. A central entrance to and exit from the vehicle is provided with doors under the control of the operator, and a turnstile is provided for dividing the body portion into two compartments.

A number of electric vehicles of the so-called one-man type have been constructed and are now in service, but the same are objectionable in that the operator of the vehicle is stationed on the front platform, thus necessitating a front entrance to, and exit from, the vehicle. A single four-wheel propelling truck is provided for supporting the body portion, thus entailing the usual rough-riding qualities of a single-truck vehicle.

In an electric vehicle constructed in accordance with my invention, a booth is provided in the top central portion of the body of the vehicle for the operator of the car and for containing a single set of main control apparatus that may be utilized for operating the vehicle in a forward and in a reverse direction. The operator in the central booth may conveniently control the operation of the doors for a central entrance to, and exit from, the vehicle, supervise the placing of the fares in a box, which is disposed below the operator, and replace the trolley in contact with the trolley conductor, whenever necessary, without leaving the control booth. Two two-wheel propelling trucks are pivotally joined to the body portion near the ends thereof so that the motors of the vehicle may be inspected and repaired from the sides and the ends of the vehicle without necessitating getting under the same by the use of pits, and the weight of the body portion is supported on the trucks in a manner tending to maintain the trucks in correct alinement. Moreover, the seats of the vehicle are disposed to permit the wheels to operate thereunder and thus allow the floors to be disposed substantially below the axles of the trucks.

In the accompanying drawings, Figure 1 is a side elevational view of an electric vehicle constructed in accordance with my invention; Fig. 2 is a view, partially in section and partially in plan, of the vehicle illustrated in Fig. 1 of the drawing.

Referring to the accompanying drawings, an electric vehicle 1 is provided with a body portion 2 having an operator's booth 3 disposed in the top central portion thereof and two two-wheel trucks 4 and 5 which are pivotally connected to the body portion 2.

The trucks 4 and 5 are respectively provided with driving wheels 7 and 8 which are mounted on axles 9 and 10. The axle 9 is provided with bearings 11, and the axle 10 is provided with bearings 12 for supporting the body portion of the vehicle thereon. Two arms 13 and 14, each of which is rotatively supported, near one end, on the axle 9, are pivotally connected together and to a bar 15. The bar 15, which is pivotally connected to the two arms 13 and 14, is connected to the body portion 2 of the vehicle by a pivotal connection 16 which permits the bar 15 to effect a movement of rotation in a vertical plane. The truck 5 is provided with a pair of arms 17 and 18 which are pivotally joined together and to a bar 19 in a manner similar to the connection between the arms 13 and 14 and the bar 15. The bar 19 is connected to the body portion 2 by a pivotal connection 20 in a manner similar to the connection of the bar 15 to the body portion 2. The truck 4 is provided with a propelling motor 21, and the truck 5 is provided with a propelling motor 22, each motor being mounted on the outside of its respective truck so as to be more readily accessible for inspection and cleaning.

The body portion 2 of the vehicle is provided with a central entrance 23 having a door 24 and a central exit 25 having a door 26. Within the body portion and below the booth 3, in a position to be supervised by the operator of the vehicle, is disposed an automatic change box 27, a fare box 28, and, adjacent to the fare box, is provided a turnstile 29 for separating the body portion of the vehicle into two compartments and thus permit the rapid loading and unloading of the vehicle. The seats 30 of the vehicle are disposed in a position to permit the wheels 7 and 8 to effect a movement of rotation thereunder whenever the vehicle negotiates a curve and thus permits location of the floor 31 of the vehicle substantially below the axles 9 and 10 of the trucks 4 and 5.

The booth 3 is provided with a portion 32 which extends above the body portion 2 in order to permit the operator of the vehicle to have a clear view of the traffic ahead and to permit the operator to effect a quick replacement of the trolley 33 in contact with the trolley conductor 34. The operator is provided with seats 35 between which is disposed the main control apparatus 36 of the vehicle.

The arms 13 and 18 of the trucks 4 and 5 are connected by means of a rod 37, and the arms 14 and 17 are connected by means of a rod 38 in order to maintain the two trucks in correct alinement relative to each other.

The body portion of the vehicle is provided with two plates 39, one only of which is illustrated, which respectively engage the bearings 11 and 12. Each plate 39 is semicircular in contour, as is indicated in Fig. 2 of the drawing, and is provided with inclined surfaces 40 and 41 which are disposed above each bearing 11, as indicated in Fig. 1 of the drawing. The bearings 11 are provided with rollers 42 which engage the plate 39, and the inclined surfaces 40 and 41 are disposed in position above the rollers 42 so that the weight of the body portion tends to maintain the axle 9 in the position shown and in correct alinement with the body portion 2. The bearings 12 co-act with the second plate 39 in a manner similar to that described in referring to the truck 4 and the bearings 11.

From the above description, it is noted that a vehicle is disclosed which is provided with two two-wheel trucks, a body portion which is provided with a floor disposed below the axles of the two trucks, a central entrance to, and exit from, the vehicle and a booth for the operator of the vehicle which is centrally disposed so that the operator may control the operation of the motors, the opening and closing of the doors and the replacement of the trolley in contact with the trolley conductor without leaving the booth. Moreover, the vehicle is provided with means, embodying the two rods 37 and 38, for maintaining the trucks 4 and 5 in correct alinement relative to each other and with means embodying the plates 39 which coöperate with the bearings 11 and 12 to maintain the trucks 4 and 5 in alinement with the body portion 2 of the vehicle.

Modifications in the system and arrangement and location of parts may be made within the spirit and scope of my invention and such modifications are intended to be covered by the appended claims.

I claim as my invention:

1. In an electric vehicle, two swinging trucks, a body portion mounted on said trucks and radially connected thereto, means for maintaining the two trucks in alinement with each other, and propelling motors mounted on the trucks.

2. In an electric vehicle, a body portion, two two-wheel swinging propelling trucks radially connected to the body portion, and means for supporting the weight of the body portion on the trucks in a manner tending to maintain the two trucks in correct alinement.

3. In an electric vehicle, a body portion, two two-wheel swinging propelling trucks radially connected to the body portion, means for maintaining the trucks in alinement relative to each other and means for supporting the weight of the body portion on the trucks in a manner to maintain the trucks in correct alinement relative to the body portion.

4. In an electric vehicle, the combination with two two-wheel propelling trucks having means tending to maintain them alined with each other, of a body portion mounted on said trucks and provided with a control apartment in the top central portion thereof, and a central entrance to, and exit from, the vehicle.

5. In an electric vehicle, a plurality of propelling trucks, a body portion mounted on said trucks, said body portion having a top central booth for the operator of the vehicle and for containing the main control apparatus, and a fare box and a change box located below the operator of the vehicle.

6. In an electric vehicle, a body portion having a top central booth for the operator of the vehicle, a central entrance to, and exit from, the car, and a turnstile disposed below the operator's booth for separating the body portion into two compartments.

7. In an electric vehicle, a body portion having a top central booth for the operator of the vehicle and for containing the main control apparatus, a turnstile located below the booth for dividing the vehicle into two compartments, and a central entrance to, and exit from, the vehicle.

8. In an electric vehicle, a body portion, a two-wheel truck so pivotally connected to the ends of the body portion that the vertical longitudinal plane of the axle thereof is external to said pivotal connection, propelling motors mounted on the trucks and extending beyond the respective ends of the body portion, and means tending to maintain the trucks in correct alinement.

9. In an electric vehicle, two two-wheel trucks, a body portion mounted on said trucks and having the floor thereof located substantially below the axles of the wheels of said trucks, propelling motors mounted on said trucks, and control apparatus located in a top central portion of the body portion midway between the trucks for governing the operation of the motors.

10. In an electric vehicle, a body portion, two two-wheel swinging propelling trucks radially connected to the body portion, and inclined guides for supporting the body portion on the trucks in a manner to maintain the trucks in correct alinement.

11. In an electric vehicle, a plurality of propelling trucks, and a body portion mounted on said trucks and provided with a top central portion for the operator of the vehicle.

12. In an electric vehicle, a body portion, two two-wheel propelling trucks pivotally joined to the body portion, the floor of said body portion being disposed below the axles of said wheels, a central entrance to, and exit from, the vehicle, and a booth for the vehicle operator that is disposed in the top central portion of the body portion.

13. In an electric vehicle, two trucks, a body portion mounted on the trucks and having a floor disposed substantially below the axles of the wheels of said trucks, control apparatus located in a top compartment in the body portion midway between the two trucks and substantially above the floor of the body portion for governing the operation of the vehicle, a central entrance to, and exit from, the car, and a turnstile disposed below the top compartment for separating the body portion into two compartments.

In testimony whereof, I have hereunto subscribed my name this 20th day of July, 1917.

LYNN G. RILEY.